United States Patent
Carlson et al.

(10) Patent No.: US 7,963,445 B2
(45) Date of Patent: Jun. 21, 2011

(54) ARRANGEMENT FOR AND METHOD OF SUPPRESSING ELECTROMAGNETIC RADIATION INTERFERENCE IN AN IMAGING READER

(75) Inventors: Bradley Carlson, Huntington, NY (US); William Sackett, Rocky Point, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 416 days.

(21) Appl. No.: 12/316,099

(22) Filed: Dec. 9, 2008

(65) Prior Publication Data

US 2010/0141824 A1    Jun. 10, 2010

(51) Int. Cl.
- *G06K 7/10* (2006.01)
- *G06F 7/10* (2006.01)
- *H04N 5/217* (2011.01)

(52) U.S. Cl. ............... 235/454; 235/462.29; 348/241

(58) Field of Classification Search ............ 235/462.28, 235/462.29; 348/355
See application file for complete search history.

(56) References Cited

U.S. PATENT DOCUMENTS

| | | | |
|---|---|---|---|
| 5,477,042 A * | 12/1995 | Wang | 235/462.1 |
| 6,082,621 A * | 7/2000 | Chan et al. | 235/462.28 |
| 7,278,577 B2 * | 10/2007 | Yahagi et al. | 235/462.28 |
| 7,775,434 B2 * | 8/2010 | Mashiko | 235/462.01 |
| 7,800,789 B2 * | 9/2010 | Kimura et al. | 358/474 |
| 2003/0210822 A1 * | 11/2003 | Endo | 382/236 |
| 2005/0231624 A1 * | 10/2005 | Muramatsu et al. | 348/311 |
| 2006/0192012 A1 * | 8/2006 | Madej | 235/462.27 |
| 2008/0013858 A1 * | 1/2008 | Hohda et al. | 382/275 |

\* cited by examiner

*Primary Examiner* — Lin Ye
*Assistant Examiner* — John H Morehead, III

(57) ABSTRACT

An imager in an imaging reader captures light from a target, generates image data from the captured light, and generates a pixel clock signal having a pixel clock frequency in synchronism with the image data. A controller is connected via an electrical conductor to the imager, and controls the imager to transfer the image data, receives the image data, and processes the image data. A circuit suppresses electromagnetic radiation generated by the conductor during the image data transfer, and includes a spread spectrum modulator for modulating the pixel clock signal to generate a variable spread spectrum signal having a spread spectrum frequency that periodically varies above and below the pixel clock frequency, and a buffer having a plurality of registers for receiving and temporarily storing the image data, and for varying as a function of the spread spectrum frequency how much of the image data is being temporarily stored.

17 Claims, 2 Drawing Sheets

ARRANGEMENT FOR AND METHOD OF SUPPRESSING ELECTROMAGNETIC RADIATION INTERFERENCE IN AN IMAGING READER

DESCRIPTION OF THE RELATED ART

Solid-state imaging systems or imaging readers have been used to capture light from targets, such as symbols to be electro-optically read, or non-symbols to be imaged. Target symbols include one-dimensional bar code symbols, particularly of the Universal Product Code (UPC) type, each having a row of bars and spaces spaced apart along one direction, as well as two-dimensional symbols, such as Code 49, which introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes an imaging module having a solid-state imager with a sensor array of cells or photosensors, which correspond to image elements or pixels in a field of view of the imager, and an imaging lens assembly for capturing return light scattered and/or reflected from the symbol being imaged, and for projecting the return light onto the sensor array to initiate capture of an image of the symbol. Such an imager may include a one- or two-dimensional charge coupled device (CCD) or a complementary metal oxide semiconductor (CMOS) device and associated circuits for producing and processing electronic signals corresponding to a one- or two-dimensional array of pixel information over the field of view, and is analogous to the imaging module used in a digital consumer camera to capture images. A controller or programmed microprocessor processes the electrical signals and, when the target is a symbol, decodes and thereby reads the symbol.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

In operation, the imager acquires image signals of image data, and sequentially shifts and transfers the image data away from the imager at a clock frequency under the control of the controller. As imagers with ever higher resolutions have been made available, the amount of image data to be transferred is larger and, as a result, the clock frequency needs to be increased. The imager and the controller are typically mounted on separate printed circuit boards and, hence, are typically interconnected by a flexible cable. The image data is transferred between the imager and the controller over this flexible cable.

Although the known imaging reader is generally satisfactory for its intended purpose, one concern relates to electromagnetic interference (EMI) caused when a large amount of the image data is transferred at high clock frequencies between the imager and the controller over this flexible cable. The cable acts like an antenna and radiates undesirable radiation, which must be suppressed. The use of shielding materials to suppress EMI is restricted due to the small size and low weight requirements for the imaging module in the reader.

To suppress EMI, it is known to use a spread spectrum clock at an input to the imager. This has proven to be undesirable, because noise is introduced by such frequency spreading into the image data transferred from the imager, thereby degrading performance. It is also known to use a spread spectrum clock at an output of the imager. This has also proven to be undesirable, because oversampling of the image data causes redundant image data to be generated, and the controller must determine which of the image data is redundant, thereby slowing performance.

SUMMARY OF THE INVENTION

One feature of the present invention resides, briefly stated, in an arrangement for, and a method of, suppressing electromagnetic radiation interference in an imaging reader. The reader includes a solid-state imager, such as a CCD or a CMOS, having a one- or a two-dimensional array of image sensors, preferably of megapixel resolution, and operative for capturing return light from a target over a field of view. The imager also generates image data from the captured light, and generates a pixel clock signal having a pixel clock frequency in synchronism with the image data.

The reader also includes a controller operatively connected via an electrical conductor to the imager, for controlling the imager to transfer the image data, for receiving the image data transferred along the conductor, and for processing the image data into processed information indicative of the target. The controller and the imager are preferably mounted on separate printed circuit boards, and the conductor is a cable extending between the boards.

In accordance with this invention, a suppression circuit is provided for suppressing electromagnetic radiation generated by the conductor during transfer of the image data. The suppression circuit includes a spread spectrum modulator operatively connected to the imager, for modulating the pixel clock signal to generate a variable spread spectrum signal having a spread spectrum frequency that periodically varies above and below the pixel clock frequency, and a buffer, preferably a first-in and first-out (FIFO) queue, having a plurality of registers operatively connected to the imager, for receiving and temporarily storing the image data, and operatively connected to the spread spectrum modulator for varying as a function of the spread spectrum frequency how much of the image data is being temporarily stored.

In a preferred embodiment, the controller is operative for generating and conducting a master clock signal to the imager for processing into the pixel clock signal. The pixel clock frequency is constant over time, and the spread spectrum frequency varies over time between minimum values and maximum values. An average of the spread spectrum frequency is substantially equal to the pixel clock frequency. More of the registers temporarily store the image data when the spread spectrum frequency is lower than the pixel clock frequency, and less of the registers temporarily store the image data when the spread spectrum frequency is greater than the pixel clock frequency.

Hence, in accordance with this invention, electromagnetic radiation suppression is achieved without using a spread spectrum modulator at an input to the imager, thereby preventing the introduction of noise by such frequency spreading into the image data transferred from the imager, and degrading performance. Also, oversampling of the image data does not occur; redundant image data is not generated; and the controller is no longer tasked with determining which of the image data is redundant, thereby slowing performance.

The method of suppressing electromagnetic radiation interference in an imaging reader is performed by capturing return light from a target over a field of view of a solid-state imager, generating image data from the captured light, generating a pixel clock signal having a pixel clock frequency in synchronism with the image data, operatively connecting a controller via an electrical conductor to the imager, controlling the imager to transfer the image data, receiving the image data transferred along the conductor, processing the image data into processed information indicative of the target, and suppressing electromagnetic radiation generated by the conductor during transfer of the image data. The suppressing is performed by operatively connecting a spread spectrum modulator to the imager, modulating the pixel clock signal to generate a variable spread spectrum signal having a spread spectrum frequency that periodically varies above and below the pixel clock frequency, operatively connecting a buffer having a plurality of registers to the imager to receive and temporarily store the image data, and operatively connecting the buffer to the spread spectrum modulator to vary as a function of the spread spectrum frequency how much of the image data is being temporarily stored.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
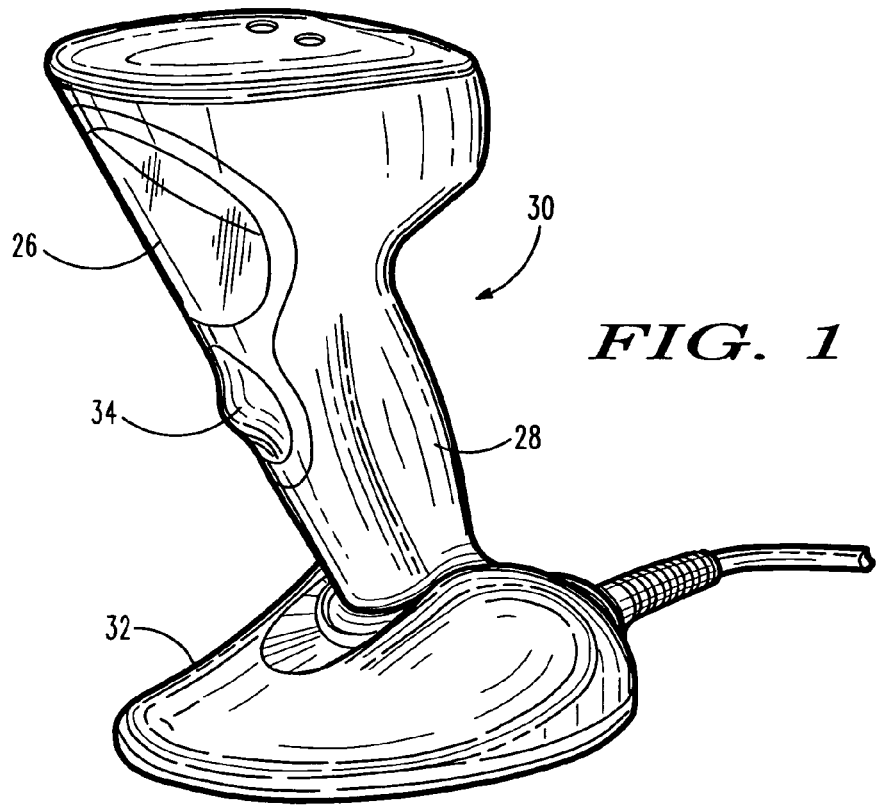
FIG. 1 is a perspective view of a portable imaging reader operative in either a handheld mode, or a hands-free mode, for capturing return light from targets.

Reference numeral 30 in FIG. 1 generally identifies an imaging reader having a window 26 and a gun-shaped housing 28 supported by a base 32 for supporting the imaging reader 30 on a countertop. The imaging reader 30 can thus be used in a hands-free mode as a stationary workstation in which products are slid, swiped past, or presented to, the window 26, or can be picked up off the countertop and held in an operator's hand and used in a handheld mode in which a trigger 34 is manually depressed to initiate imaging of targets or indicia, especially one- or two-dimensional symbols, to be read at or away from the window 26. In another variation, the base 32 can be omitted, and housings of other configurations can be employed. A cable, as illustrated in FIG. 1, connected to the base 32 can also be omitted, in which case, the reader 30 communicates with a remote host by a wireless link, and the reader is electrically powered by an on-board battery.

Figure 2:
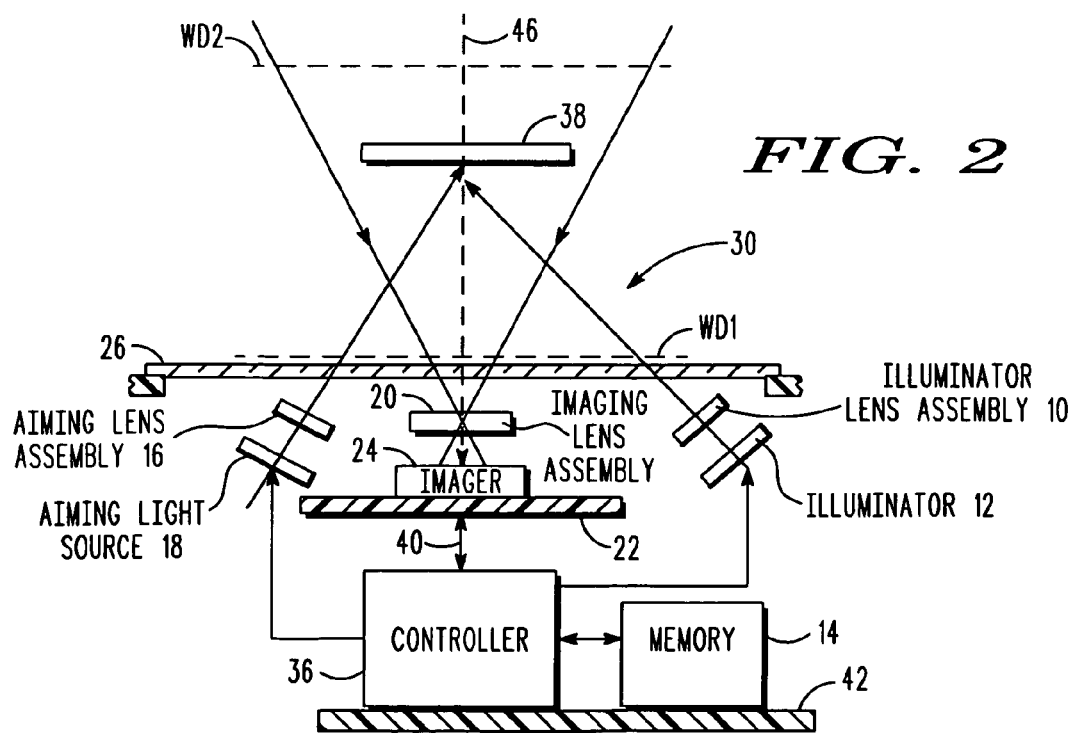
FIG. 2 is a schematic diagram of various components of the reader of FIG. 1.

As schematically shown in FIG. 2, an imager 24 is mounted on a printed circuit board 22 in the reader. The imager 24 is a solid-state device, for example, a CCD or a CMOS imager having a one-dimensional array of addressable image sensors or pixels arranged in a single, linear row, or a two-dimensional array of such sensors arranged in mutually orthogonal rows and columns, preferably of megapixel resolution, and operative for detecting return light captured by an imaging lens assembly 20 along an optical path or axis 46 through the window 26. The return light is scattered and/or reflected from a target or symbol 38 over the field of view. The imaging lens assembly 20 is preferably operative for adjustably focusing the return light onto the array of image sensors to enable the symbol 38 to be read. The symbol 38 is located anywhere in a working range of distances between a close-in working distance (WD1) and a far-out working distance (WD2). In a preferred embodiment, WD1 is about four to six inches from the imager array 24, and WD2 can be many feet from the window 26, for example, around fifty feet away.

An illuminating assembly is also mounted in the imaging reader and preferably includes an illuminator or illuminating light source 12, e.g., one or more light emitting diodes (LEDs), and an illuminating lens assembly 10 to uniformly illuminate the symbol 38 with an illuminating light pattern during reading. An aiming assembly is also mounted in the imaging reader and preferably includes an aiming light source 18, e.g., one or more LEDs, and an aiming lens assembly 16 for generating an aiming light pattern on the symbol 38 prior to reading.

As shown in FIG. 2, the imager 24, the illuminating light source 12 and the aiming light source 18 are operatively connected to a controller or microprocessor 36 operative for controlling the operation of these components. A memory 14 is connected and accessible to the controller 36. The controller 36, and preferably, the memory 14, are mounted on another printed circuit board 42 spaced away from the board 22 in the reader. An electrical conductor 40, preferably a flexible cable, is connected between the controller 36 and the imager 24 on the boards 22, 42. Preferably, the controller 36 is the same as the one used for processing the return light from target symbols and for decoding the captured target images.

In operation, the microprocessor 36 sends a command signal to energize the aiming light source 18 prior to reading, and also pulses the illuminating light source 12 for a short exposure time period, say 500 microseconds or less, and energizes and exposes the imager 24 to collect light, e.g., illumination light and/or ambient light, from a target symbol only during said exposure time period. A typical array needs about 16-33 milliseconds to acquire the entire target image and operates at a frame rate of about 30-60 frames per second. The imager 24 thus acquires image data, and sequentially shifts and transfers the image data away from the imager 24 at a clock frequency under the control of the controller 36. The image data is transferred between the imager 24 and the controller 36 over the flexible cable 40. Due to high imager resolution, high image transfer rates and a high clock frequency, as discussed above, undesirable electromagnetic radiation, which must be suppressed, is propagated by the cable 40, which acts like an antenna and radiates radiation.

Figure 3:
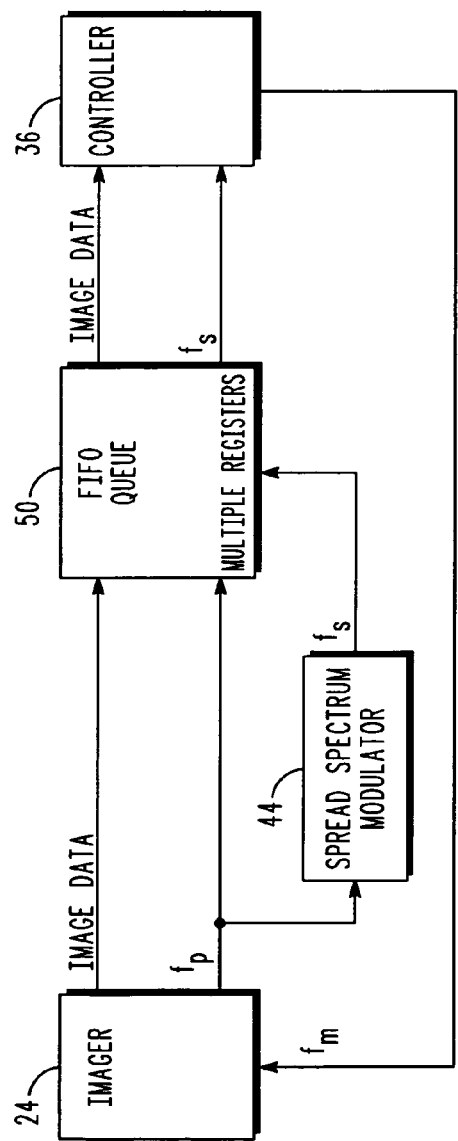
FIG. 3 is a diagrammatic view of an arrangement for suppressing electromagnetic radiation interference in the reader of FIG. 1 in accordance with the present invention.

One feature of the present invention resides, briefly stated, in an arrangement for, and a method of, suppressing such electromagnetic radiation interference caused by the cable 40 in the imaging reader 30 during transfer of the image data. The suppression circuit includes, as shown in FIG. 3, a spread spectrum modulator 44 operatively connected to the imager 24, for modulating a pixel clock signal having a pixel clock frequency $f_p$ to generate a variable spread spectrum signal having a spread spectrum frequency $f_s$ that periodically varies above and below the pixel clock frequency $f_p$, and a buffer 50, preferably a first-in and first-out (FIFO) queue, having a plurality of registers operatively connected to the imager 24, for receiving and temporarily storing the image data, and operatively connected to the spread spectrum modulator 44 for varying as a function of the spread spectrum frequency $f_s$ how much of the image data is being temporarily stored in the registers.

Figure 4:
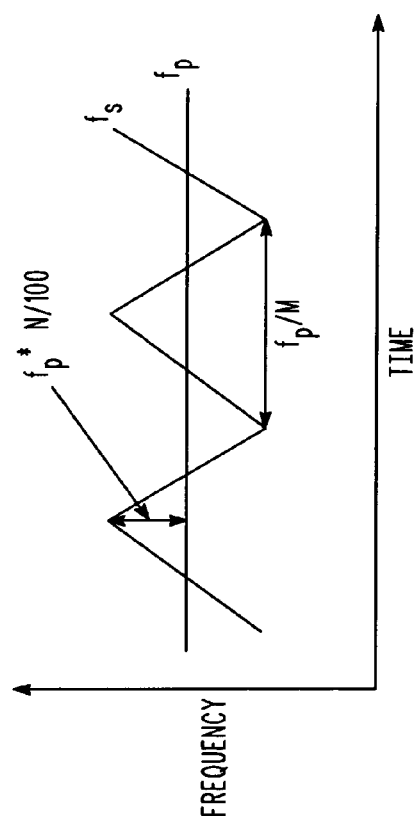
FIG. 4 is a graph of frequency versus time to explain operation of the arrangement of FIG. 3 in accordance with the method of the present invention.

In a preferred embodiment, the controller 36 is operative for generating and conducting a master clock signal having a master clock frequency $f_m$ to the imager 24 for processing into the pixel clock signal. As shown in FIG. 4, the pixel clock frequency $f_p$ is constant over time, and the spread spectrum frequency $f_s$ varies over time between minimum values and maximum values. The spread spectrum signal resembles a sawtooth waveform. An average of the spread spectrum frequency $f_s$ is substantially equal to the pixel clock frequency $f_p$. More of the registers temporarily store the image data when the spread spectrum frequency $f_s$ is lower than the pixel clock frequency $f_p$, and less of the registers temporarily store the image data when the spread spectrum frequency $f_s$ is greater than the pixel clock frequency $f_p$.

The buffer 50 has adequate register capacity or size to accumulate the image data produced by the master clock signal when the pixel clock signal is running at its minimum frequency. When the pixel clock signal varies to its maximum frequency, the buffer 50 has extra image data in it to satisfy the controller 36. The size "B" of the buffer 50 can be determined, as described below. First, let N=percent spreading of $f_s$ relative to $f_p$, and let M=the factor to determine the frequency of the spreading, e.g., $f_p/M$ is the frequency of the spreading function (how quickly $f_s$ is changing).

For half of the sweep period, $(f_p/M)$ $f_s$ is running slower than $f_p$. The average frequency of $f_s$ during this period is $f_s$ $(1-N/200)$. The time duration is $M/2f_p$. The number of samples of $f_p$ in this window is $M/2$. The number of samples of $f_s$ in this window is $M(1-N/200)/2$. The size "B" of the buffer 50 needs to be large enough to hold the difference between these numbers of samples. Therefore, $$B=M/2-M(1-N/200)/2=MN/400.$$

By way of numerical example, if N=10% and M=2000, then B=50.

In accordance with this invention, the amount of data in the buffer 50 is modulating as the spread spectrum signal varies. When $f_s$ is running slow, the buffer registers are filling up. When $f_s$ is running fast, the buffer registers are emptying. The buffer 50 can be slightly oversized to provide some margin.

Control logic can be added such that if the buffer 50 reaches (or nears) an empty state, then $f_s$ is set to its minimum frequency. Likewise, if the buffer 50 reaches (or nears) a full state, then $f_s$ is set to its maximum frequency.

It will be understood that each of the elements described above, or two or more together, also may find a useful application in other types of constructions differing from the types described above While the invention has been illustrated and described as an arrangement for, and a method of, suppressing electromagnetic radiation in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for suppressing electromagnetic radiation interference in an imaging reader, comprising:
  a) a solid-state imager for capturing return light from a target over a field of view, for generating image data from the captured light, and for generating a pixel clock signal having a pixel clock frequency in synchronism with the image data;
  b) a controller operatively connected via an electrical conductor to the imager, for controlling the imager to transfer the image data, for receiving the image data transferred along the conductor, and for processing the image data into processed information indicative of the target; and
  c) a suppression circuit for suppressing electromagnetic radiation generated by the conductor during transfer of the image data, the suppression circuit including
    1) a spread spectrum modulator operatively connected to the imager, for modulating the pixel clock signal to generate a variable spread spectrum signal having a spread spectrum frequency that periodically varies above and below the pixel clock frequency, and
    2) a buffer having a plurality of registers operatively connected to the imager, for receiving and temporarily storing the image data, and operatively connected to the spread spectrum modulator for varying as a function of the spread spectrum frequency how much of the image data is being temporarily stored.

2. The arrangement of claim 1, wherein the imager has an array of photosensors and has a megapixel resolution.

3. The arrangement of claim 1, wherein the controller is operative for generating and conducting a master clock signal to the imager for processing into the pixel clock signal.

4. The arrangement of claim 1, wherein the controller and the imager are mounted on separate printed circuit boards, and wherein the conductor is a cable extending between the boards.

5. The arrangement of claim 1, wherein the pixel clock frequency is constant over time, and wherein the spread spectrum frequency varies over time between minimum values and maximum values.

6. The arrangement of claim 4, wherein an average of the spread spectrum frequency is substantially equal to the pixel clock frequency.

7. The arrangement of claim 1, wherein more of the registers temporarily store the image data when the spread spectrum frequency is lower than the pixel clock frequency, and wherein less of the registers temporarily store the image data when the spread spectrum frequency is greater than the pixel clock frequency.

8. The arrangement of claim 1, wherein the buffer is a first-in and first-out (FIFO) queue.

9. An imaging reader for electro-optically reading symbols by image capture, comprising:
  A) a housing; and
  B) an imaging module supported by the housing, the module having an arrangement for suppressing electromagnetic radiation interference including
    a) a solid-state imager for capturing return light from a symbol over a field of view, for generating image data from the captured light, and for generating a pixel clock signal having a pixel clock frequency in synchronism with the image data,
    b) a controller operatively connected via an electrical conductor to the imager, for controlling the imager to transfer the image data, for receiving the image data transferred along the conductor, and for processing the image data into processed information indicative of the target, and c) a suppression circuit for suppressing electromagnetic radiation generated by the conductor during transfer of the image data, the suppression circuit including
1) a spread spectrum modulator operatively connected to the imager, for modulating the pixel clock signal to generate a variable spread spectrum signal having a spread spectrum frequency that periodically varies above and below the pixel clock frequency, and
2) a buffer having a plurality of registers operatively connected to the imager, for receiving and temporarily storing the image data, and operatively connected to the spread spectrum modulator for varying as a function of the spread spectrum frequency how much of the image data is being temporarily stored.

10. A method of suppressing electromagnetic radiation interference in an imaging reader, comprising the steps of:
a) capturing return light from a target over a field of view of a solid-state imager, generating image data from the captured light, and generating a pixel clock signal having a pixel clock frequency in synchronism with the image data;
b) operatively connecting a controller via an electrical conductor to the imager, controlling the imager to transfer the image data, receiving the image data transferred along the conductor, and processing the image data into processed information indicative of the target; and
c) suppressing electromagnetic radiation generated by the conductor during transfer of the image data, by
1) operatively connecting a spread spectrum modulator to the imager, and modulating the pixel clock signal to generate a variable spread spectrum signal having a spread spectrum frequency that periodically varies above and below the pixel clock frequency, and
2) operatively connecting a buffer having a plurality of registers to the imager to receive and temporarily store the image data, and operatively connecting the buffer to the spread spectrum modulator to vary as a function of the spread spectrum frequency how much of the image data is being temporarily stored.

11. The method of claim 10, and configuring the imager as an array of photosensors with a megapixel resolution.

12. The method of claim 10, and generating and conducting a master clock signal to the imager for processing into the pixel clock signal.

13. The method of claim 10, and mounting the controller and the imager on separate printed circuit boards, and configuring the conductor as a cable extending between the boards.

14. The method of claim 10, and configuring the pixel clock frequency to be constant over time, and configuring the spread spectrum frequency to vary over time between minimum values and maximum values.

15. The method of claim 14, and configuring an average of the spread spectrum frequency to be substantially equal to the pixel clock frequency.

16. The method of claim 10, and temporarily storing the image data in more of the registers when the spread spectrum frequency is lower than the pixel clock frequency, and temporarily storing the image data in less of the registers when the spread spectrum frequency is higher than the pixel clock frequency.

17. The method of claim 10, and configuring the buffer as a first-in and first-out (FIFO) queue.

* * * * *